G. H. CHINNOCK.

LAMP-BURNER.

No. 7,634. Reissued April 24, 1877.

Witnesses,
H. A. Chapin
Chandler Hall

George H. Chinnock,
by his Atty.
Edwin H. Brown.

N. PETERS, PHOTO-LITHOGRAPHER, WASHINGTON, D. C.

UNITED STATES PATENT OFFICE.

GEORGE H. CHINNOCK, OF NEW YORK, N. Y.

IMPROVEMENT IN LAMP-BURNERS.

Specification forming part of Letters Patent No. 96,200, dated October 26, 1869; reissue No. 7,634, dated April 24, 1877; application filed March 14, 1877.

*To all whom it may concern:*

Be it known that I, GEORGE H. CHINNOCK, of the city, county, and State of New York, have invented certain new and useful improvements in means for illumination, of which the following is a specification:

This invention consists in improvements in a translucent or transparent base or holder for means employed to induce a draft of air to means for illumination; in improvements in air-distributer; and in improvements of minor importance, to be hereafter explained.

The accompanying drawing illustrates one example of my improvements embodied in a lamp-burner, of which—

Figure 1:
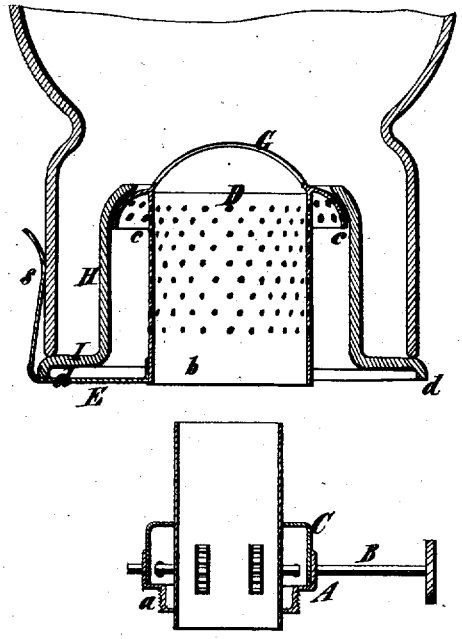
Figure 2:
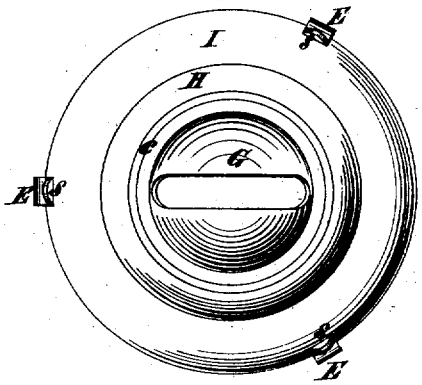

Figure 1 is a vertical section with certain parts elevated above the wick-tube, cap, and appurtenances, and Fig. 2 is a plan or top view.

Similar letters of reference designate corresponding parts in both figures.

A designates the cap of the burner, having a screw or base, *a*, to connect with the collar of a reservoir or fount. B designates a wick-adjuster, and C the body of the burner. D designates an air-distributer (shown as of cylindrical form,) arranged in an upright position and perforated with numerous fine holes. The base preferably forms or receives a ring, *b*, adapted to fit snugly around the body of the burner. From this ring *b* may extend arms E for supporting, from the air-distributer, a holder or base for the means employed to induce a draft to a flame issuing from the burner, and these arms may be provided at the outer ends with springs *s* serving to retain the said holder or base in place. G is a deflector, which, as represented, is supported by the air-distributer. It is shown as provided with a flange, *c*, serving to fit within and aid in holding in place a holder or base, H I, intended to be made of translucent or transparent material, and serving to induce a draft of air to a flame. This flange *c* is preferably provided with openings to admit air outside the deflector to the flame. The holder or base H I is for supporting means for inducing a draft of air to a flame; and it consists of a tubular portion, H, supported on the burner, and a laterally-extending flange, I, for supporting the means for inducing the draft of air to the flame. The tubular portion H is shown as, and may with advantage be, made of convex form near one end, and the flange I at its outer circumference may be with advantage, and as represented is, provided with a rim, *d*, extending in the direction of the length of the said holder or base. This holder or base is shown as being arranged so that the flange I is below the tubular portion H. Though I prefer to make it of glass, I do not limit myself in this particular. It is obvious that it contributes to inducing a draft of air to a flame. The holder or base and means supported thereon, for inducing a draft of air to a flame within them, are shown as, and may with advantage be, so combined and secured together, that they may be removed and adjusted simultaneously and together.

What I claim as my invention, and desire to secure by Letters Patent, is—

1. A detachable translucent or transparent holder or base for supporting means for inducing a draft of air to a burner, provided with a tubular portion and a laterally-extending flange, one end fitting around the outer circumference of the air inlet or distributer of a burner, and the other extending outward beyond the said air inlet or distributer, whereby it serves to establish a connection between the latter, and the means for inducing the draft without casting shadows, and without additional parts of transparent or translucent material.

2. A detachable translucent or transparent holder or base, adapted to support means for inducing a draft of air to a burner, provided with a cylindrical tubular portion, a flange extending laterally therefrom, and fitting at the end farthest from the latter around the outer circumference of the air inlet or distributer of a burner.

3. A detachable translucent or transparent holder or base, adapted to support means for inducing a draft of air to a burner, provided with a tubular portion, a flat flange extending laterally therefrom, and fitting at the end farthest from the latter around the outer circumference of the air inlet or distributer of a burner.

4. A detachable translucent or transparent holder or base, adapted to support means for inducing a draft of air to a burner, made separate from the air inlet or distributer of the burner, independent of any deflector-tip, and provided with a tubular portion, partly of convex shape, and a flange extending laterally therefrom for supporting the means for inducing the draft to the burner.

5. A detachable translucent or transparent holder or base, adapted to support means for inducing a draft of air to a burner, made separate from the burner, independent of any deflector-tip, and provided with a tubular portion, a flange extending laterally from the latter, and a rim extending from said flange in the direction of the length of said holder or base.

6. A detachable translucent or transparent holder or base, adapted to support means for inducing a draft of air to a burner, made separate from the burner, independent of any deflector-tip, provided with a rim formed in the same piece with and extending in the direction of the length of said holder or base, and fitting at the end farthest from said rim around the outer circumference of the air-distributer or inlet.

7. The combination, with a burner, of a translucent or transparent holder or base, fitting at one end around the outer circumference of the air inlet or distributer, and at the other extending out laterally beyond the same, means supported thereon to induce a draft of air to the burner, both being capable of adjustment on and removal from the burner without separation.

8. The combination of a translucent or transparent holder or base, fitting at one end around the outer circumference of the air inlet or distributer of a burner, and at the other extending laterally beyond the same, and means supported thereon both contributing to induce a draft of air to a flame issuing from a burner.

9. The combination, with a burner, of a translucent or transparent holder or base, provided with a tubular portion, fitting around the outer circumference of the air inlet or distributer of a burner, and a flange extending laterally beyond the air inlet or distributer, and means extending from the air inlet or distributer of the burner to retain it in place.

GEO. H. CHINNOCK.

Witnesses:

CHANDLER HALL,

THOMAS E. BIRCH.